July 2, 1929.  C. J. HOLSLAG  1,719,112
WELDING GENERATOR
Filed Feb. 26, 1926  2 Sheets-Sheet 1
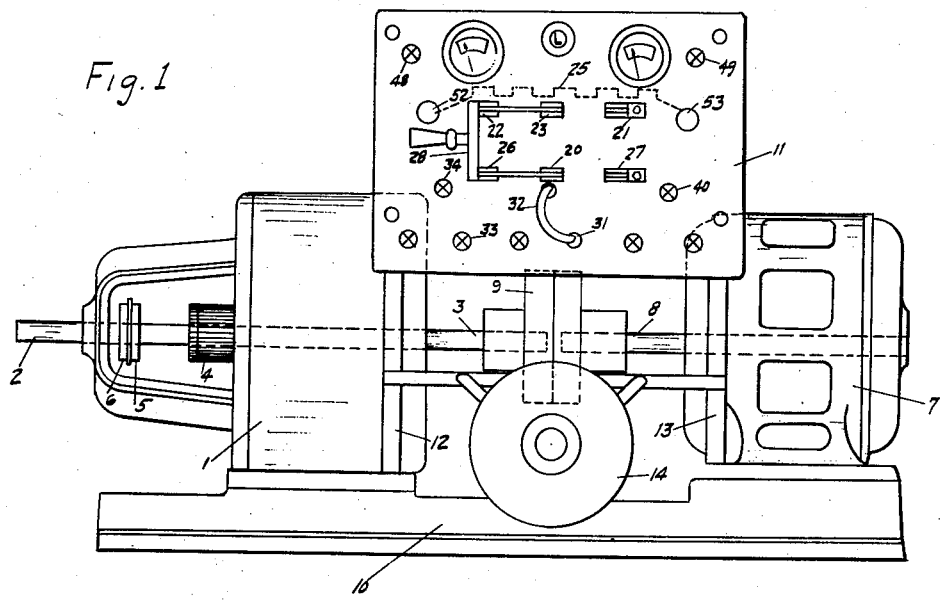
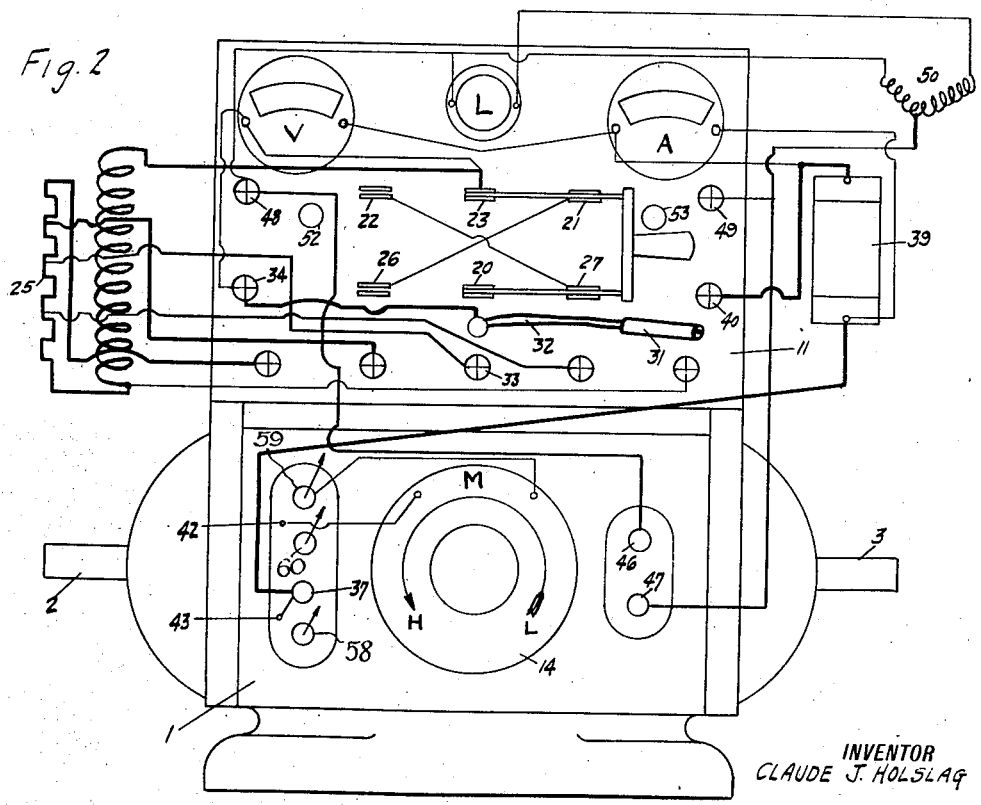
INVENTOR
CLAUDE J. HOLSLAG
BY
A. D. T. Libby
ATTORNEY July 2, 1929.                C. J. HOLSLAG                 1,719,112
                          WELDING GENERATOR
                    Filed Feb. 26, 1926        2 Sheets-Sheet 2
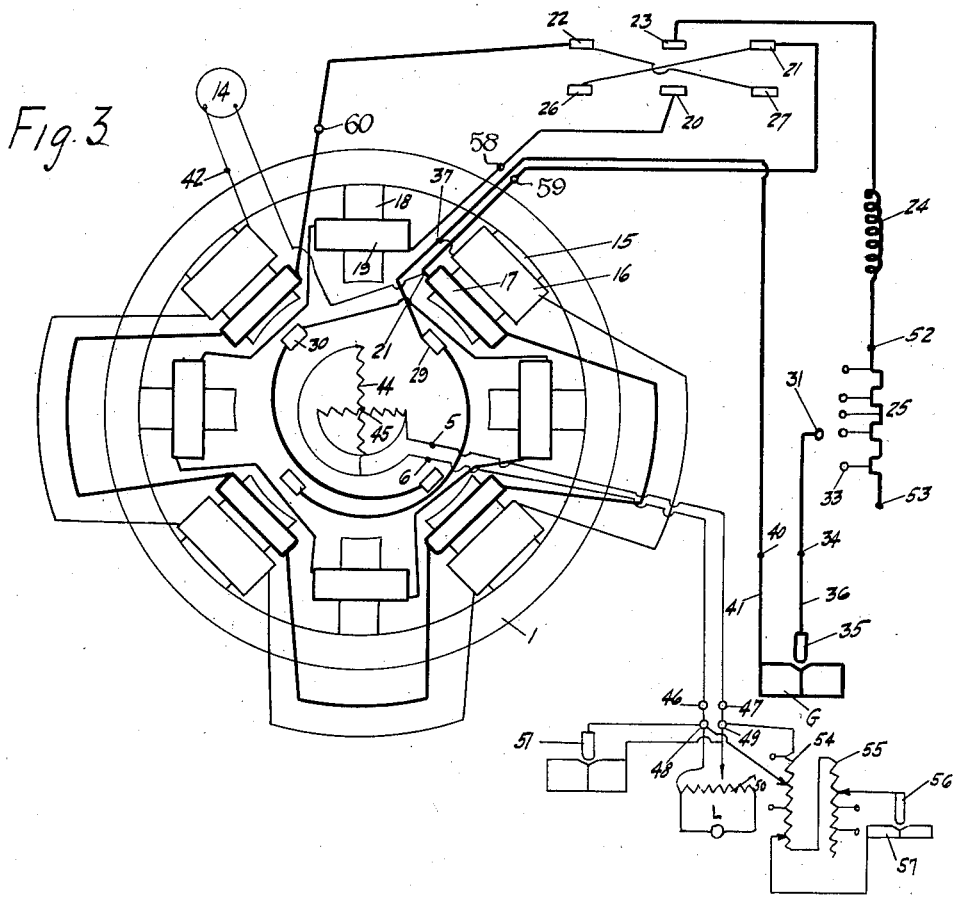
INVENTOR
CLAUDE J. HOLSLAG
BY
ATTORNEY Patented July 2, 1929.

1,719,112

UNITED STATES PATENT OFFICE.

CLAUDE J. HOLSLAG, OF SOUTH ORANGE, NEW JERSEY, ASSIGNOR TO ELECTRIC ARC CUTTING & WELDING COMPANY, OF NEWARK, NEW JERSEY.

WELDING GENERATOR.

Application filed February 26, 1926. Serial No. 90,785.

This invention relates to electric welding. In this particular art it is the practice to use a specially designed direct current generator, having either constant voltage, or constant current control, or to use a specially designed A. C. transformer, as described in my reissue Patent 16,012, issued March 3, 1925.

Since the design of the A. C. welding transformers use of which is described in the above referred to reissue patent, I have found that there are many cases, where either or both A. C. or D. C. are desired, either to satisfy some work requirement, or requirement of an operator. It is therefore, the principal object of this invention to provide a generator, which will deliver both A. C. and D. C. both of which can be controlled or regulated so as to meet various classes of work, many of which will be later referred to.

Another object of my invention is to provide a generator, which while delivering the current in accordance with the requirements specified above, may also be utilized to operate an auxiliary piece of apparatus, which will also be later pointed out.

Other and further objects will be clearly apparent to one skilled in this art, after a study of the specification taken in connection with the annexed drawing, wherein:

Figure 1, illustrates a partial assembled view of the generator connected to an electric motor, and a control switchboard, all mounted on a sub-base.

Figure 2, is a schematic diagram of the control switchboard shown in Figure 1.

Figure 3, is a schematic diagram showing an arrangement of the generator field coils and the external connections.

In the drawing 1, is an electric generator, having a shaft extension 2, at one end and a shaft extension 3, at the other end. The generator armature has a commutator 4, and a pair of slip rings 5 and 6. For the sake of clearness the brush rigging and connections to the slip rings are omitted from the drawing.

In the case of Figure 1, the generator 1, is adapted to be driven by any suitable source of power, such as a motor 7, which may be either a direct current motor or an alternating current motor. The motor shaft 8, is connected to the generator shaft end 3, by the medium of a coupling 9. The generator 1, and the motor 7 are adapted to be mounted on a sub-base 10, thereby forming an integral unit, which can be mounted on a hand truck, for the purpose of carrying the welding unit to some point adjacent the work. The unit is further completed by a switchboard 11, that is fastened, either directly to the sub-base 10, or as shown in Figure 1, it is supported by the brackets 12 and 13, held in position by the corner bolts that hold the motor and the generator to the sub-base 10.

The switchboard 11, carries the necessary control switch and plugs, for obtaining the desired electrical characteristics from the generator.

The unit shown in Figure 1, also carries a rheostat 14, used for controlling the shunt field of the generator, and on the back side of the unit is mounted a resistance unit 25, by means of studs 52 and 53, and a reactor 24, used in the D. C. welding circuit, the reactor preferably being attached to the sub-base 10, this being shown diagrammatically in Figures 2 and 3.

The generator as diagrammatically illustrated in Figure 3, is provided with a plurality of main poles 15, on which are positioned field coils 16, four being shown and connected in shunt across the D. C. brushes, through the rheostat 14. The main pole pieces 15, also carry series coils 17. Positioned between the main pole pieces 15, are smaller inter-poles 18, on which are positioned exciting coils 19.

The coils 19 carry the same current as the series coils 17, and the end of the coils 19, is connected to the switch blade 20, while one end of the series winding 17 is connected to a switch contact 21 and the other end to switch contact 22. The switch blade 23, is connected to the inductance 24, which in turn is connected to the resistance 25, it being understood, of course, that the relative positions of inductance 24 and resistance 25, may be reversed. Switch contact 21 is connected to the switch contact 26 and switch contact 22 to switch contact 27. These contacts and switch blades are generally referred to as switch 28.

The main D. C. brushes 29 are connected together and to the work that is to be welded, while the other D. C. brushes 30 of opposite polarity are connected together, and to the beginning of the series winding 19.

As shown in Figure 3, when the switch 28 is thrown to the right, so that the switch blades 20 and 23 engage the contacts 27 and 21 respectively, then the connections are such that the generator acts as a series compound machine, then having characteristics suitable for carbon arc welding, which requires for the best work approximately forty volts. However, when direct current is desired for metallic arc welding, switch 28 is thrown to the left so the switch blades 20 and 23 engage contacts 26 and 22, which reverses the direction of the current through the series coils 17, thereby giving the generator series differential characteristics suitable for metallic arc welding, at approximately 20 volts.

For external control of the D. C. current, a switch plug 31, is provided, connected to a flexible cable 32, so that plug 31, may be slipped over the spring plugs or sockets 33, whereby various portions of the resistance 25 or inductance 24, may be secured.

As shown in Figure 3, the plug 31 is connected to a cooperating plug or socket 34, to which the welding handle 35, carrying a flexible lead 36 may be connected.

The connecting block on the generator is mounted on the back side, referring to Figure 1, but is diagrammatically illustrated in Figure 3, the switchboard being shown connected entirely to the base of the generator. The D. C. armature brushes 29, are brought out to a terminal post 37, and are connected from there, through an ammeter shunt 39 to a connecting plug or a socket 40, to which a flexible lead 41 is adapted to be connected, carrying the circuit to the ground side G, of the work to be welded. The other main terminals 58, 59 and 60 are connected to the switch contacts 20, 21 and 22, respectively, but for the sake of clarity, the connection wires are not shown in Figure 2.

The shunt winding is brought out to the terminals 42 and 43, the first of which is connected to the rheostat and the other to the post 37.

The armature winding illustrated diagramatically by the coils 44 and 45, is tapped and brought out to a pair of slip rings 5 and 6, see Figure 1, from which alternating current is led to the connecting posts 46, and 47, see Figure 2. The terminal post 46 is connected to a spring connecting plug or socket 48, while the terminal 47 is connected to a similar plug or socket 49, on the switchboard.

Bridged across the connecting plugs or sockets 48 and 49 is a transformer 50, preferably of the so called auto type, in which taps are brought out whereby various potentials may be obtained, depending on the character of the work to be performed. However, it is to be understood that the winding of the generator armature is such that the right reactance is obtained directly therefrom without any external regulation of any kind, for the semi-arc, nickel-spotting process, such as described in Schuman Patent 1,452,936, issued April 4, 1923. This direct connection is illustrated by the work and electrode 51.

When welding on jobs, such as repairing cracked water jackets, furnace sections, crank cases, and for general cast iron or steel sections, one of my special transformers is connected as shown in Figure 3, where 54 is the main winding and 55 is the auxiliary winding from which an electrode 56 extends to the work 57. For A. C. welding the voltage and reactance is changed by this separate transformer, such as described in my reissue Patent 16,012, or another type of transformer may be used for rivet heating, and resistance welding.

Furthermore, by means of the transformer 50, connected to the slip rings of the generator armature, suitable power may be obtained for operating electric drills, chippers, caulkers, etc. As shown in Figure 2, these auxiliary devices may be operated by a plug attached to the lamp socket L, on the switchboard.

The generator shaft extension 2, may be utilized for driving an air compressor or some other device useful as a part of welding equipment.

The generator is constructed so that the armature may be operated either right hand or left hand, thereby making the same very adaptable for mounting, to be driven by either a motor or an internal combustion engine, or other source of power.

The generator is self-exciting, and the various windings, including that of the armature, are so arranged that upon short-circuiting of the A. C. leads for any length of time, the voltage drops so as to hold practically constant current and before dropping, that is during the instant of the spotting, when this process is being used, holds substantially constant heat. On the D. C. side the series differential winding acts in the same manner; a dead short-circuit for a continuous period of approximately five seconds brings the generator voltage down so that the current is held approximately constant, and during the drooping period substantially constant heat is maintained.

When the generator is being used as a straight compound machine, the resistance and reactance 25 and 24, are so arranged that not over the sustainable current can be drawn from the generator, and the generator can thus be short-circuited indefinitely without injury.

A dualarc generator is thus obtained which is capable of supplying current for a number of purposes, such as carbon arc welding, metallic arc welding, either D. C. or A. C.; A. C.

spot welding, butt welding or resistance welding, semi-arc, or nickel spotting, and the like, or power for lights or auxiliary apparatus, and while I have shown, more or less, in diagrammatical drawings, how my invention is utilized, it will be understood that the details are capable of variation over a wide range and I thus do not want to be unduly limited in the scope of the appended claims.

Having thus described my invention, what I claim is:

1. A welding unit including; a generator adapted to deliver alternating and direct current, said generator having at least two sets of series windings, means for selecting either type of welding current and means for connecting said series windings in cumulative or differential relationship.

2. A welding unit including; a generator adapted to deliver alternating and direct current, said generator having a shunt winding and two sets of series windings, means for selecting either type of welding current and means for connecting said series windings so as to obtain series compound or series differential action.

3. A welding unit including; a generator adapted to deliver alternating and direct current, said generator having a shunt winding and two sets of series windings, means for selecting either type of welding current and means for connecting said series windings so as to meet the arc requirements for a relatively high arc voltage for carbon arc and a much lower voltage for metallic arc welding.

4. A welding unit including; a generator adapted to deliver alternating and direct current, said generator having a shunt winding and two sets of series windings, means for selecting either type of welding current, means for connecting said series windings so as to obtain series compound or series differential action, and further means for adjusting the voltage of the alternating current when selected so that the processes known in the trade as semi arc, nickel spotting and the like may be obtained directly from the generator.

5. A welding unit including; a self exciting generator adapted to deliver both alternating and direct current and to be driven either right or left handed, said generator having a shunt winding and two sets of series windings, means for selecting either type of welding current and means for connecting said series winding so as to obtain series compound or series differential action.

6. A welding unit including; a self exciting generator adapted to deliver both alternating and direct current and to be driven either right or left handed, said generator having an armature provided with a D. C. commutator and A. C. collector rings for taking off the respective kinds of current, said generator having further a shunt winding and a series winding, means for reversing at least a part of the series winding for the purposes described and a transformer connected to said collector rings, whereby the full energy of the armature may be obtained or a fraction thereof for the purposes described.

7. A welding unit including; a generator adapted to deliver alternating and direct current, said generator having a shunt and two series windings, means for reversing at least a part of series winding whereby, when the D. C. terminals are short circuited for an appreciable time the current in the arc circuit is held constant.

8. A welding unit including; a generator adapted to deliver at least direct current, said generator having alternately larger and smaller pole pieces, a shunt winding on the larger pole pieces at least two series windings, one of said series windings being arranged on the smaller pole pieces between the pole pieces carrying said shunt windings and means for connecting at least one of said series windings in cumulative or differential relationship with respect to the shunt winding.

9. A welding unit including; a generator adapted to deliver at least direct current, said generator having alternately larger and smaller pole pieces, at least two sets of series windings, one set being arranged on the smaller pole pieces between the pole pieces carrying said other set of series windings and means for connecting said series windings in cumulative or differential relationship.

10. A welding unit including; a generator having its armature adapted to be driven in either direction of rotation and to deliver alternating and direct current, said generator having a shunt winding and at least two series windings, one series winding being on the same pole pieces with the shunt winding and the other series winding being disposed on pole pieces intermediate the pole pieces carrying the shunt and first mentioned series winding and means for connecting said series winding in cumulative or differential relationship.

11. A welding unit including; a generator having its armature adapted to deliver alternating and direct current, said generator having a shunt winding and at least two series windings, one series winding being on the same pole pieces with the shunt winding and the other series winding being disposed on pole pieces intermediate the pole pieces carrying the shunt and first mentioned series winding, and means for reversing the direction of current in the series winding on the pole pieces carrying the shunt winding.

12. A welding unit including; a generator adapted to deliver from the same armature alternating and direct current, said armature being excited by a set of main pole pieces having exciting windings thereon and a set of inter poles, arranged alternately between said main poles, said inter-poles having a winding adapted to carry the entire welding current delivered by the D. C. side of the generator.

13. A welding unit including; a generator adapted to deliver from the same armature alternating and direct current, said armature being excited by, a set of main pole pieces having shunt and series exciting windings thereon and a set of inter-poles arranged alternately between said main poles, said inter-poles having a winding adapted to carry always in the same direction the entire welding current delivered by the D. C. side of the generator, and means for reversing the welding current through the series winding on the main pole pieces for the purposes described.

14. A welding unit including; a generator having a field ring with main and auxiliary pole pieces alternately arranged thereon, windings on said pole pieces, switching means for passing the welding current through at least a part of the windings on said pole pieces, an armature adapted to be driven in either direction and to deliver alternating and direct current and means for selecting either kind of current for welding and means for readily reversing the welding current through at least a part of the said field windings.

15. A welding unit including; a generator adapted to deliver alternating and direct current, said generator having a shunt and a plurality of series windings, means for selecting either type of welding current according to the work required, means for reversing at least one of said series windings for the purposes described, and means for utilizing the alternating current at different voltages for the various purposes described.

In testimony whereof, I affix my signature.

CLAUDE J. HOLSLAG.